United States Patent
Yang et al.

(10) Patent No.: US 10,229,629 B2
(45) Date of Patent: Mar. 12, 2019

(54) ELECTRONIC DEVICE

(71) Applicant: LG ELECTRONICS INC., Seoul (KR)

(72) Inventors: Hyunsuk Yang, Seoul (KR); Hangseok Kim, Seoul (KR); Minho Park, Seoul (KR); Jaeyoung Han, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/724,083

(22) Filed: Oct. 3, 2017

(65) Prior Publication Data

US 2018/0374411 A1 Dec. 27, 2018

(30) Foreign Application Priority Data

Jun. 27, 2017 (KR) ........................ 10-2017-0081307

(51) Int. Cl.
| | |
|---|---|
| *G06F 3/0481* | (2013.01) |
| *G06F 3/0484* | (2013.01) |
| *G06F 3/0488* | (2013.01) |
| *G09G 3/20* | (2006.01) |
| *A63F 13/25* | (2014.01) |
| *H05K 5/00* | (2006.01) |

(52) U.S. Cl.
CPC ........... *G09G 3/2096* (2013.01); *A63F 13/25* (2014.09); *G06F 3/0488* (2013.01); *H05K 5/0017* (2013.01); *G06F 3/04817* (2013.01); *G06F 3/04845* (2013.01); *G09G 2354/00* (2013.01); *G09G 2380/02* (2013.01)

(58) Field of Classification Search
None
See application file for complete search history.

(56) References Cited

U.S. PATENT DOCUMENTS

| | | | |
|---|---|---|---|
| 2011/0051332 A1* | 3/2011 | Zhang | ..................... F16C 29/02 361/679.01 |
| 2011/0148797 A1* | 6/2011 | Huitema | ............... G06F 1/1615 345/173 |

* cited by examiner

*Primary Examiner* — Nicholas J Lee
(74) *Attorney, Agent, or Firm* — Lee Hong Degerman Kang & Waimey

(57) ABSTRACT

An electronic device includes first and second body part; a third body part connecting the first and second body parts such that the first an second body parts are switched to an unfolded state or a folded state, a display unit disposed on one surface of each of the first and second body parts and provided such that a partial region thereof is foldable in the unfolded state and the folded state, an extending part extending in the unfolded state, a support part including first and second support regions supporting the display unit, and an elastic force providing unit providing an elastic force in different directions such that the unfolded state and the folded state are maintained.

17 Claims, 13 Drawing Sheets

ELECTRONIC DEVICE

CROSS-REFERENCE TO RELATED APPLICATION

Pursuant to 35 U.S.C. § 119(a), this application claims the benefit of earlier filing date and right of priority to Korean Application No. 10-2017-0081307, filed on Jun. 27, 2017, the contents of which are incorporated by reference herein in its entirety.

BACKGROUND OF THE INVENTION

1. Field of the Invention

The present disclosure relates to an electronic device having a foldable display unit.

2. Background of the Invention

Electronic devices may be generally classified as mobile/portable electronic devices or stationary electronic devices according to their mobility. Electronic devices may also be classified as handheld electronic devices or vehicle mounted electronic devices according to whether or not a user can directly carry the electronic device.

As technologies have advanced, electronic devices have various functions. For example, electronic devices are embodied in the form of a multimedia player or device supporting functions such as capturing images or video, reproducing music or video files, playing games, receiving broadcast signals, and the like. Efforts are ongoing to support and increase the functionality of electronic devices. Such efforts include software and hardware improvements, as well as changes and improvements in the structural components.

Recently, as deformable foldable display units have been developed, foldable devices have been researched. However, when the display unit is folded and unfolded at a specific curvature, the display unit may be curved or folded body parts may not be fixed and thus cannot be maintained to be flat.

SUMMARY OF THE INVENTION

Therefore, an aspect of the detailed description is to provide an electronic device which includes a foldable display and which is stably maintained in a folded state and unfolded state.

To achieve these and other advantages and in accordance with the purpose of this specification, as embodied and broadly described herein, an electronic device includes: first and second body part; a third body part connecting the first and second body parts such that the first an second body parts are switched to an unfolded state or a folded state; a display unit disposed on one surface of each of the first and second body parts and provided such that a partial region thereof is foldable in the unfolded state and the folded state an extending part provided in any one of the first and second body parts and extending in the unfolded state; a support part provided in any one of the first and second body parts and including first and second support regions each including a plurality of ribs, assembled to each other in the folded state, and separated from each other in the unfolded state to support the display unit; and an elastic force providing unit disposed to be adjacent to the support part and providing an elastic force in different directions such that the unfolded state and the folded state are maintained.

The elastic force providing unit may include: first and second swivel arms disposed in a recess part provided in the first body part and having one end connected to the first body part; and an elastic part connecting the other ends of the first and second swivel arms, wherein the first and second swivel arms rotatably move in mutually opposite directions with respect to the one end in the folded state and unfolded state. Accordingly, the elastic force providing unit may provide an elastic force such that a current state is maintained in the folded state and the unfolded state.

The first body part may include a spring part disposed in a receiving space and elastically supporting the extending part, and thus, the first body part may be more easily switched to the unfolded state by an external force.

In the folded state, the display unit may output first screen information on a first region corresponding to the first body part, and when the body part is switched to the unfolded state, second screen information different from the first screen information may be output on a second region corresponding to the second body part, and a portion of the first screen information may be displayed on a third region provided between the first and second regions, whereby screen information may be displayed on the third region disposed on a side surface in the folded state to thus implement a larger display region of the display unit.

According to the present disclosure, since an elastic force is applied to different directions in the folded state and unfolded state, the first and second body parts may stably maintain a current state.

Also, due to the presence of the support part including a plurality of ribs assembled in the folded state and separated in the unfolded state, the entire region of the display unit may be stably supported in the unfolded state.

Also, since the extending part drawn from the first body part in the unfolded state is provided, when the display unit is unfolded, the display unit may be maintained to be flat.

Further scope of applicability of the present application will become more apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Figure 1A:
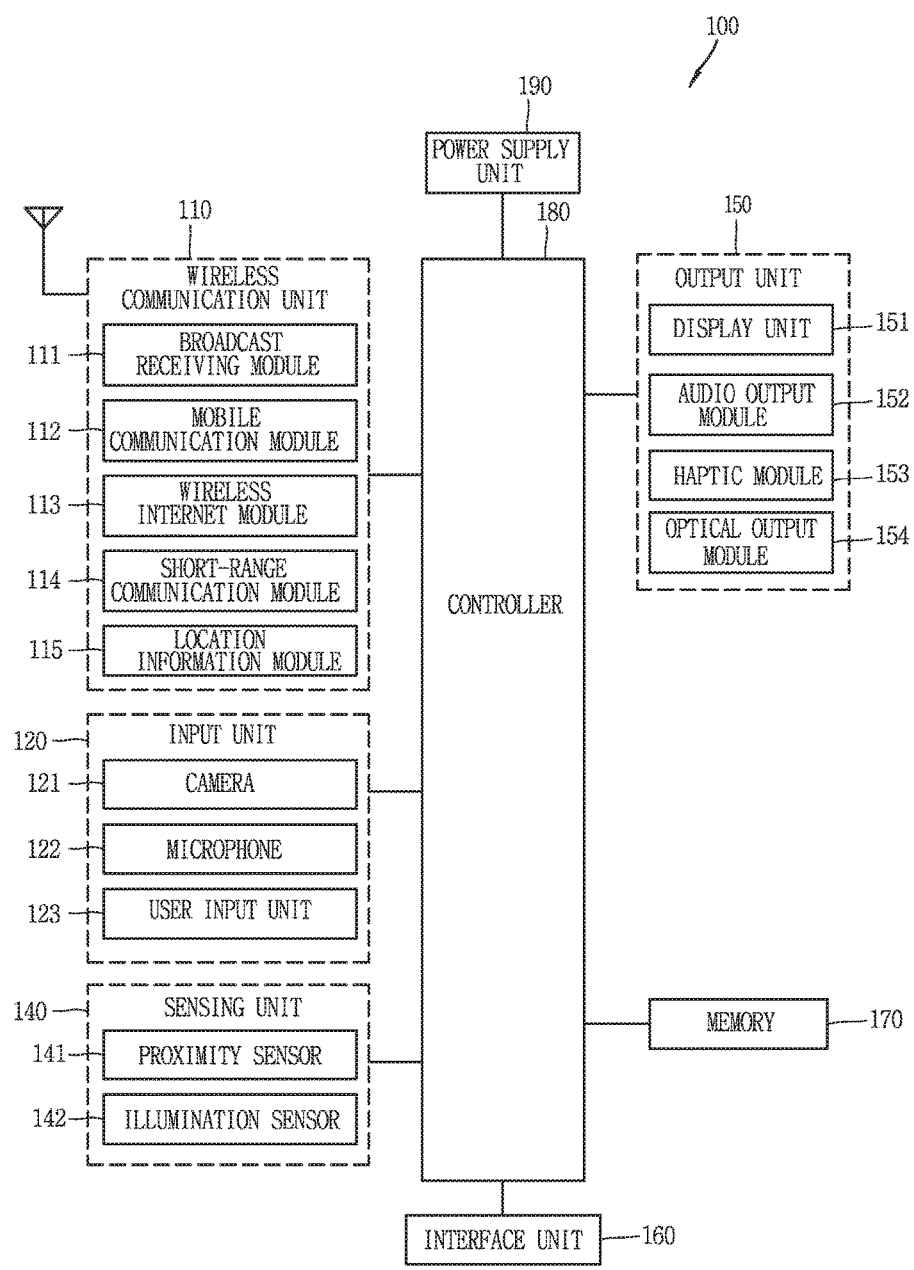
FIG. 1A is a block diagram illustrating an electronic device related to the present disclosure.

First, FIG. 1A is a block diagram illustrating an electronic device 100 related to the present disclosure.

The electronic device 100 is shown having components such as a wireless communication unit 110, an input unit 120, a sensing unit 140, an output unit 150, an interface unit 160, a memory 170, a control unit 180, and a power supply unit 190. It is understood that implementing all of the illustrated components is not a requirement, and that greater or fewer components may alternatively be implemented.

The wireless communication unit 110 typically includes one or more modules which permit communications such as wireless communications between the electronic device 100 and a wireless communication system, communications between the electronic device 100 and another electronic device, communications between the electronic device 100 and an external server.

Further, the wireless communication unit 110 typically includes one or more modules which connect the electronic device 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by control unit 180 according to device parameters, user commands, and combinations thereof.

The sensing unit 140 is typically implemented using one or more sensors configured to sense internal information of the electronic device, the surrounding environment of the electronic device, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The electronic device 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the electronic device 100 and a user, as well as function as the user input unit 123 which provides an input interface between the electronic device 100 and the user.

The interface unit 160 serves as an interface with various types of external devices that can be coupled to the electronic device 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the electronic device 100 may perform assorted control functions associated with a connected external device, in response to the external device being connected to the interface unit 160.

The memory 170 is typically implemented to store data to support various functions or features of the electronic device 100. For instance, the memory 170 may be configured to store application programs executed in the electronic device 100, data or instructions for operations of the electronic device 100, and the like. Some of these application programs may be downloaded from an external server via wireless communication. Other application programs may be installed within the electronic device 100 at time of manufacturing or shipping, which is typically the case for basic functions of the electronic device 100 (for example, receiving a call, placing a call, receiving a message, sending a message, and the like). It is common for application programs to be stored in the memory 170, installed in the electronic device 100, and executed by the control unit 180 to perform an operation (or function) for the electronic device 100.

The control unit 180 typically functions to control overall operation of the electronic device 100, in addition to the operations associated with the application programs. The control unit 180 may provide or process information or functions appropriate for a user by processing signals, data, information and the like, which are input or output by the various components depicted in FIG. 1A, or activating application programs stored in the memory 170. As one example, the control unit 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the electronic device 100. The power supply unit 190 may include a battery, and the battery may be configured to be embedded in the terminal body, or configured to be detachable from the terminal body.

At least some of the above components may operate in a cooperating manner, so as to implement an operation or a control method of a glass type terminal according to various embodiments to be explained later. The operation or the control method of the glass type terminal may be implemented on the glass type terminal by driving at least one application program stored in the memory 170.

Referring still to FIG. 1A, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the electronic device 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the electronic device 100 and a wireless communication system, communications between the electronic device 100 and another electronic device 100, or communications between the electronic device and a network where another electronic device 100 (or an external server) is located, via wireless area networks. One example of the wireless area networks is a wireless personal area networks.

In some embodiments, another electronic device (which may be configured similarly to electronic device 100) may be a wearable device, for example, a smart watch, a smart glass or a head mounted display (HMD), which is able to exchange data with the electronic device 100 (or otherwise cooperate with the electronic device 100). The short-range communication module 114 may sense or recognize the wearable device, and permit communication between the wearable device and the electronic device 100. In addition, when the sensed wearable device is a device which is authenticated to communicate with the electronic device 100, the control unit 180, for example, may cause transmission of data processed in the electronic device 100 to the wearable device via the short-range communication module 114. Hence, a user of the wearable device may use the data processed in the electronic device 100 on the wearable device. For example, when a call is received in the electronic device 100, the user may answer the call using the wearable device. Also, when a message is received in the electronic device 100, the user can check the received message using the wearable device.

The location information module 115 is generally configured to detect, calculate, derive or otherwise identify a position of the electronic device. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the electronic device.

As one example, when the electronic device uses a GPS module, a position of the electronic device may be acquired using a signal sent from a GPS satellite. As another example, when the electronic device uses the Wi-Fi module, a position of the electronic device can be acquired based on information related to a wireless access point (AP) which transmits or receives a wireless signal to or from the Wi-Fi module.

The input unit 120 may be configured to permit various types of input to the electronic device 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the electronic device 100. As another example, the cameras 121 may be located in a stereoscopic arrangement to acquire left and right images for implementing a stereoscopic image.

The microphone 122 is generally implemented to permit audio input to the electronic device 100. The audio input can be processed in various manners according to a function being executed in the electronic device 100. If desired, the microphone 122 may include assorted noise removing algorithms to remove unwanted noise generated in the course of receiving the external audio.

The user input unit 123 is a component that permits input by a user. Such user input may enable the control unit 180 to control operation of the electronic device 100. The user input unit 123 may include one or more of a mechanical input element (for example, a key, a button located on a front and/or rear surface or a side surface of the electronic device 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the electronic device at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the electronic device, surrounding environment information of the electronic device, user information, or the like. The control unit 180 generally cooperates with the sending unit 140 to control operation of the electronic device 100 or execute data processing, a function or an operation associated with an application program installed in the electronic device based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the electronic device covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, control unit 180 processes data corresponding to proximity touches and proximity touch patterns sensed by the proximity sensor 141, and cause output of visual information on the touch screen. In addition, the control unit 180 can control the electronic device 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the control unit 180. Accordingly, the control unit 180 may sense which region of the display unit 151 has been touched. Here, the touch controller may be a component separate from the control unit 180, the control unit 180, and combinations thereof.

In some embodiments, the control unit 180 may execute the same or different controls according to a type of touch object that touches the touch screen or a touch key provided in addition to the touch screen. Whether to execute the same or different control according to the object which provides a touch input may be decided based on a current operating state of the electronic device 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The control unit 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the electronic device 100. For example, the display unit 151 may display execution screen information of an application program executing at the electronic device 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the electronic device 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the control unit. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the electronic device 100.

An optical output module 154 can output a signal for indicating an event generation using light of a light source. Examples of events generated in the electronic device 100 may include message reception, call signal reception, a missed call, an alarm, a schedule notice, an email reception, information reception through an application, and the like.

A signal output by the optical output module 154 may be implemented in such a manner that the electronic device emits monochromatic light or light with a plurality of colors. The signal output may be terminated as the electronic device senses that a user has checked the generated event, for example.

The interface unit 160 serves as an interface for external devices to be connected with the electronic device 100. For example, the interface unit 160 can receive data transmitted from an external device, receive power to transfer to elements and components within the electronic device 100, or transmit internal data of the electronic device 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the electronic device 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the electronic device 100 is connected with an external cradle, the interface unit 160 can serve as a passage to allow power from the cradle to be supplied to the electronic device 100 or may serve as a passage to allow various command signals input by the user from the cradle to be transferred to the electronic device there through. Various command signals or power input from the cradle may operate as signals for recognizing that the electronic device is properly mounted on the cradle.

The memory 170 can store programs to support operations of the control unit 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The electronic device 100 may also be operated in relation to a network storage device that performs the storage function of the memory 170 over a network, such as the Internet.

The control unit 180 may typically control the general operations of the electronic device 100. For example, the control unit 180 may set or release a lock state for restricting a user from inputting a control command with respect to applications when a status of the electronic device meets a preset condition.

The control unit 180 can also perform the controlling and processing associated with voice calls, data communications, video calls, and the like, or perform pattern recognition processing to recognize a handwriting input or a picture drawing input performed on the touch screen as characters or images, respectively. In addition, the control unit 180 can control one or a combination of those components in order to implement various exemplary embodiments disclosed herein.

The power supply unit 190 receives external power or provides internal power and supply the appropriate power required for operating respective elements and components included in the electronic device 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Hereinafter, an electronic device 100 according to an embodiment of the present disclosure described above with reference to FIG. 1A or a structure of a terminal in which the aforementioned components are disposed will be described with reference to FIGS. 1B and 1C.

Figure 1B:
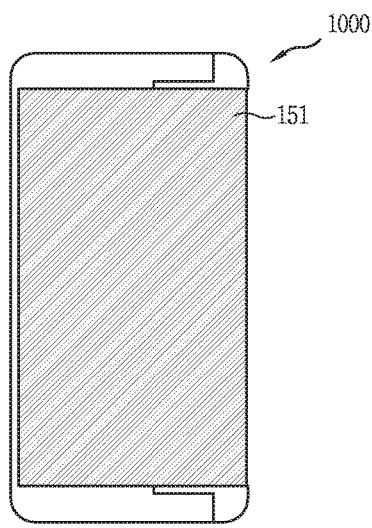
FIG. 1B is a view illustrating a folded state of an electronic device according to an embodiment of the present disclosure, viewed in one direction.
Figure 1C:
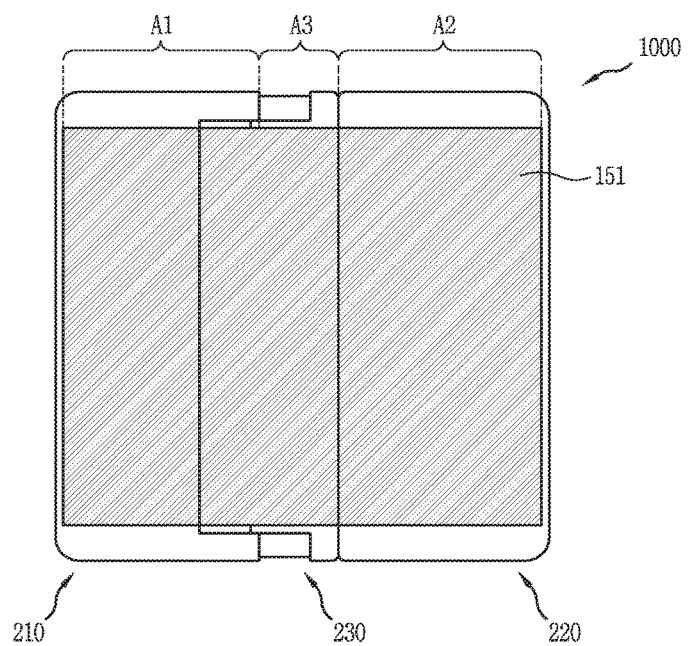
FIG. 1C is a view illustrating an unfolded state of the electronic device of FIG. 1B, viewed in one direction.
Figure 1D:
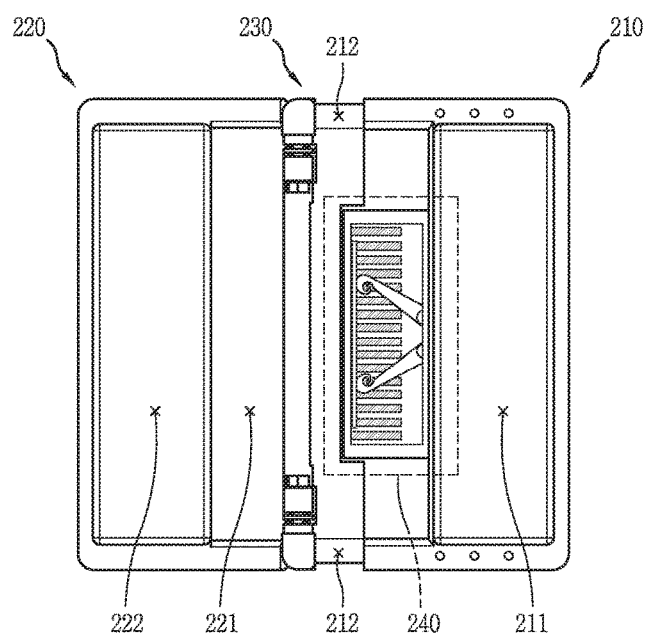
FIG. 1D is a view illustrating the electronic device of FIG. 1C, viewed in another direction.

FIG. 1B is a view illustrating a folded state (or a closed state) of an electronic device according to an embodiment of the present disclosure, viewed in one direction, FIG. 1C is a view illustrating an unfolded state (or an open state) of the electronic device of FIG. 1B, viewed in one direction, and FIG. 1D is a view illustrating the electronic device of FIG. 1C, viewed in another direction.

Figure 2A:
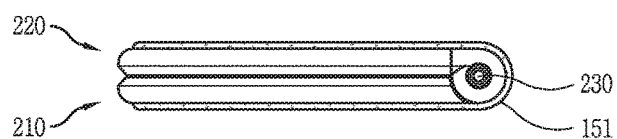
FIG. 2A is a side view of the electronic device of FIG. 1B.
Figure 2B:
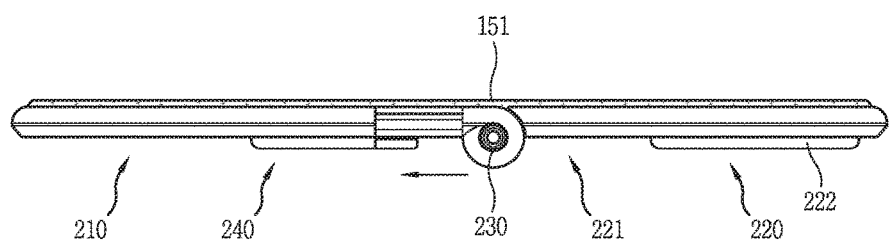
FIG. 2B is a side view of the electronic device of FIG. 1C.

FIG. 2A is a side view of the electronic device of FIG. 1B, and FIG. 2B is a side view of the electronic device of FIG. 1C.

An electronic device 1000 according to the present disclosure includes first and second body parts 210 and 220 and a hinge part 230 connecting the first and second body parts 210 and 220 such that the first and second body parts 210 and 220 relatively rotate.

The display unit 151 is disposed on one surface of the first and second body parts 210 and 220. The display unit 151 is a deformable flexible display. In the unfolded state, the first and second body parts 210 and 220 are disposed to substantially form a plane and the display unit 151 is disposed to form a plane. In the folded state, a region of the display unit 151 corresponding to the hinge part 230 is deformed as a curved surface, and in the folded state, the region corresponding to the hinge part 230 forms a side surface of the main body of the electronic device 1000, and the display unit 151 forms both surfaces of the main body.

The display unit 151 may be divided into first to three regions A1, A2, and A3. The first region A1 may be fixed to the first body part 210 and the second region A2 may be fixed to the second body part 220. The third region A3 corresponds to a space between the first and second regions A1 and A2 and covers the hinge part in the folded state. The third region A3 is supported by an extending part drawn out in the unfolded state.

The hinge part 230 includes a hinge shaft 231 and a rotary part 232 extending from the first body part 210 to surround the hinge shaft 231. The display unit 151 is disposed to surround the rotary part 232 in the folded state.

Referring to FIGS. 1C and 2B, the second body part 220 includes an extending part 217 received to the inside of the second body part in the folded state and drawn out in the unfolded state to support the display unit 151.

Meanwhile, referring to FIG. 1D, a rear surface of the second body part 220 includes a receiving region 221 and a protruding region 222, and a rear surface of the first body part 210 includes a depressed region 211 formed to correspond to the protruding region 222. Also, the first body part 210 includes an elastic providing part 240 is received by the receiving region 221 in the closed state and providing elastic force to movement of the first and second body parts 210 and 220.

A rear surface of the main body is not exposed to the outside in the closed state, and side surfaces of the main body are in contact with each other by the depressed region 211 and the receiving region 221.

The electronic device 1000 according to the present disclosure includes the extending part 217 providing a space allowing the display unit 151 to be deformed to be flat, a support part 213 having a specific shape to support the entire region of the display unit 151 in the open state, and the elastic force providing part 240 providing elastic force such that an open state of the display unit 151 is maintained. Hereinafter, the components will be described in detail.

Figure 3A:
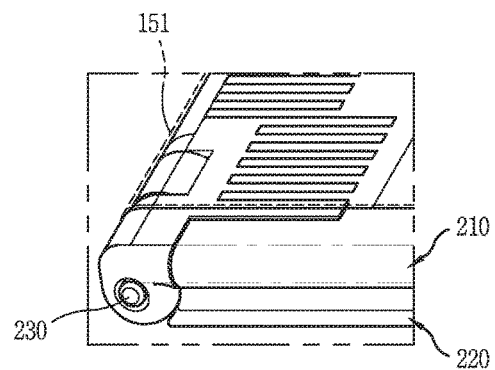
FIGS. 3A and 3B are partial views of an electronic device to explain an extending part.
Figure 3B:
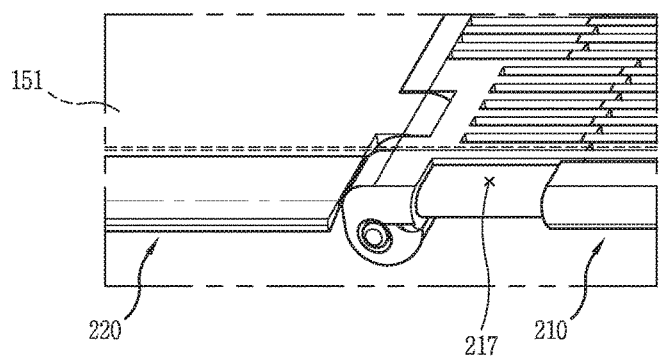
Figure 3C:
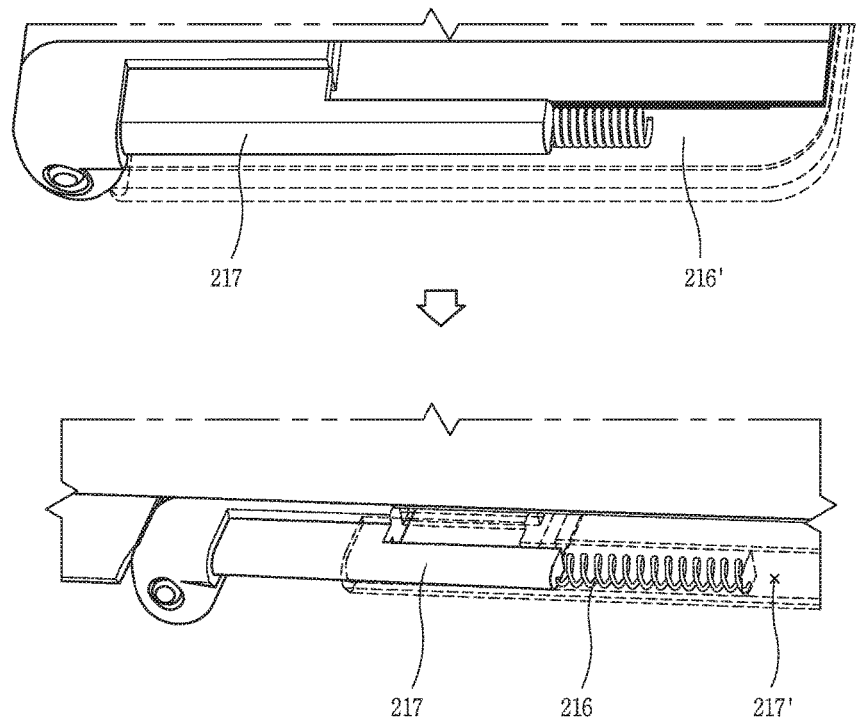
FIG. 3C is a conceptual view of an electronic device in a folded state (or a closed state) and an unfolded state (or an open state) to explain a spring part elastically supporting an extending part.

FIGS. 3A and 3B are partial views of an electronic device to explain an expanded part, and FIG. 3C is a conceptual view of an electronic device in a closed state and an open state to explain a spring part elastically supporting an expanded part.

The first body part 210 includes an extending part 217 formed in a region adjacent to the hinge part and has a thickness smaller than that of the first body part 210. Also, the first body part 210 has an internal space 217' for receiving the extending part 217. The internal space 217' may have a shape similar to that of the extending part 217 such that the entire region of the extending part 217 may be received therein in the folded state.

Meanwhile, a spring part 216 providing elastic force to the extending part 217 is disposed at an end portion of the extending part 217. The spring part 216 elastically supports an inner surface of the first body part 210 forming the internal space 217' with the extending part 217. Thus, in cases where an external force is applied to switch from the folded state to the unfolded state, the spring part 216 is elastically extended, and accordingly, the extending part 217 is exposed to the outside to easily implement the unfolded state.

Figure 4A:
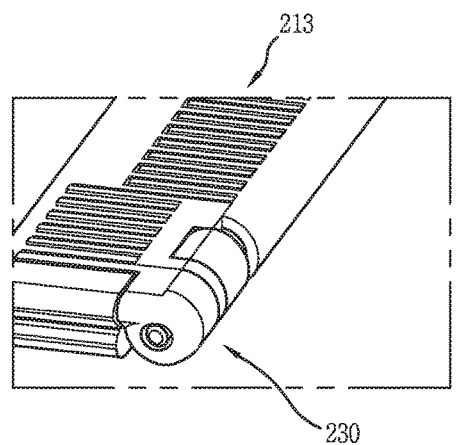
FIGS. 4A and 4B are partial views of an electronic device in a closed state and an open state to explain a support part.
Figure 4B:
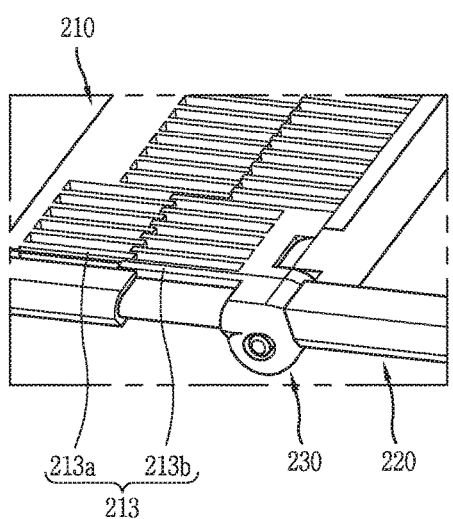
Figure 4C:
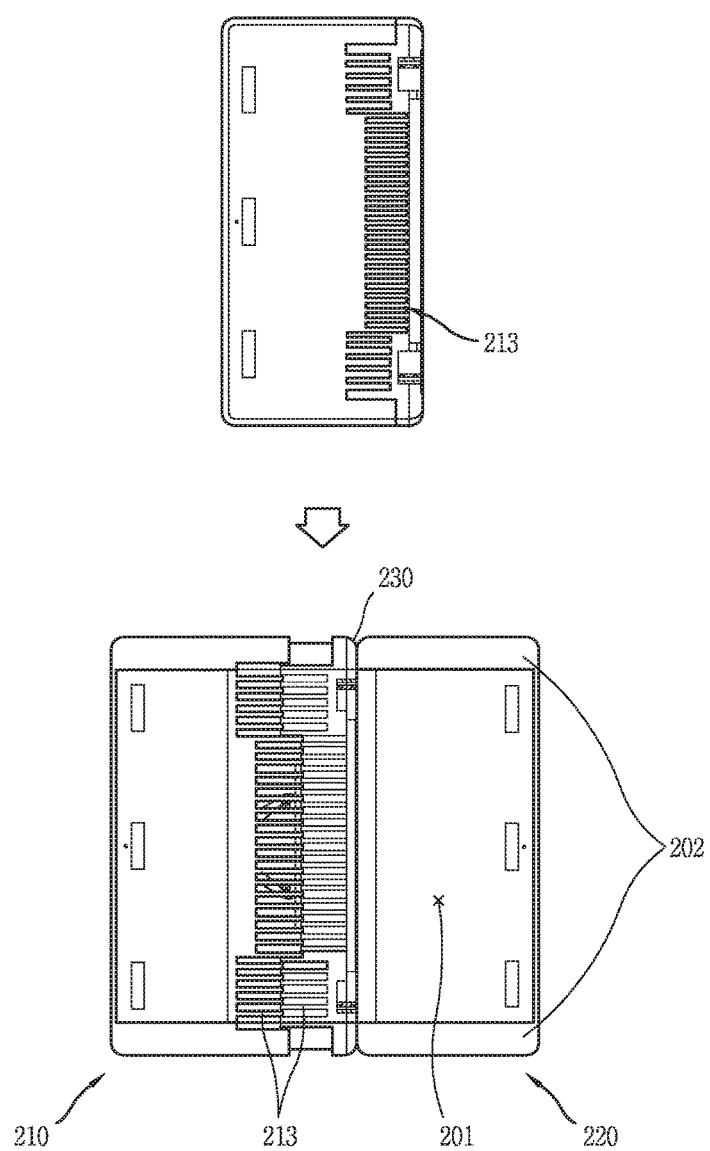
FIG. 4C is a view illustrating first and second bodies separating a display unit in a closed state and an open state to explain a support part.

FIGS. 4A and 4B are partial views of an electronic device in a closed state and an open state to explain a support part, and FIG. 4C is a view illustrating first and second bodies separating a display unit in a closed state and an open state to explain a support part.

Meanwhile, as the extending part 217 is drawn out, first and second support regions 213a and 213b of the support part 213 are separated and extended. The separated and extended first and second support regions 213a and 213b support a region of the display unit in the unfolded state.

The first and second support regions 213a and 213b include a plurality of ribs having a space therebetween. In the folded state, the plurality of ribs included in the first and second support regions 213a and 213b are inserted into the spaces, respectively. That is, the ribs assembled in a mutually crossed state. That is, according to assembling of the ribs, a space formed by the support part 213 is narrowed. The plurality of ribs extend in a direction away from the hinge part, and the plurality of ribs are arranged in a direction in which the hinge shaft extends.

As the support part 213 extends and the extending part 217 is drawn out, an area of the first body part 210 is extended in the unfolded state. Accordingly, the third region of the display unit 151 surrounding the rotary part 232 (please refer to FIG. 2B) may be supported.

Since a region of the display unit 151 is supported by the plurality of ribs forming the spaces in the unfolded state, the display unit 151 I supported in the entire region in the unfolded state, solving a problem that a specific region is depressed.

Referring to FIG. 4C, the main body including the first to third bodies 210, 220, and 230 includes a support region 201 on which the display unit 151 is mounted and a bezel region 202 forming edges of the display unit 151.

The support part 213 is provided in the support region 201 and the extending part 217 is provided in the bezel region 202. The extending part 217 may be configured as a pair of extending parts 217 surrounding an upper end and a lower end of the display unit 151.

Figure 5A:
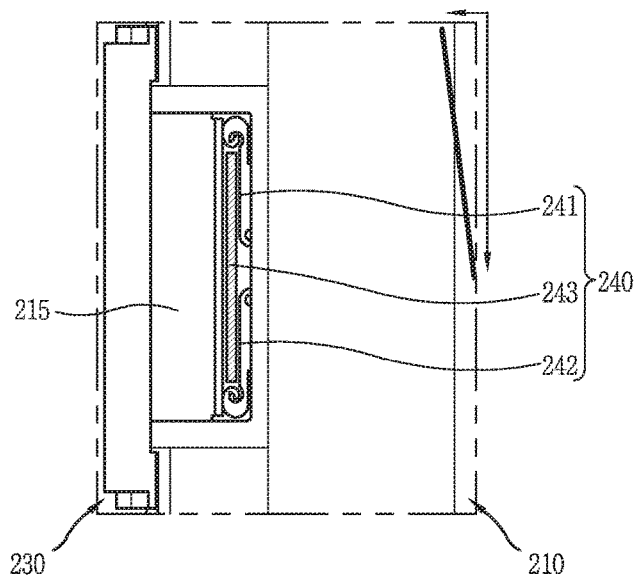
FIGS. 5A and 5B are partial views of an electronic device in a closed state and open state to explain an elastic force providing part.
Figure 5B:
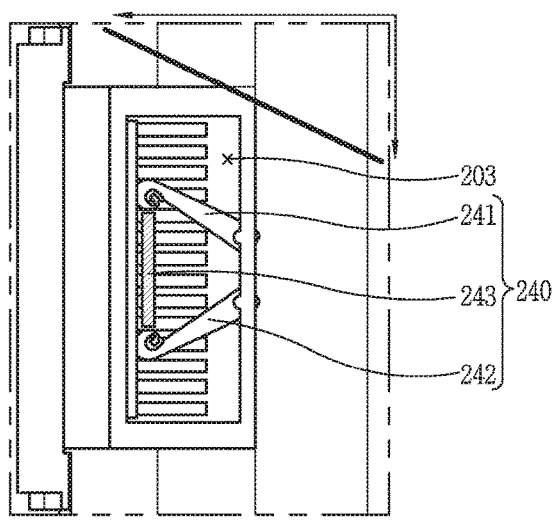

FIGS. 5A and 5B are partial views of an electronic device in a closed state and open state to explain an elastic force providing part.

The first body part 210 includes a recess region 203 formed as a region of the rear surface is depressed. The support part 213 may be exposed due to the recess region 203. The elastic force providing part 240 is disposed in the recess region 203. The elastic force providing part 240 provides elastic force in mutually different directions in the unfolded state and the folded state to implement forces for maintaining the unfolded state and the folded state, respectively.

The elastic force providing part 240 includes first and second swivel arms 241 and 242 rotatably connected to the body part and an elastic part 243 connecting the first and second swivel arms 241 and 242. One ends of the first and second swivel arms 241 and 242 are rotatably fixed to mutually adjacent regions of the first body part 210 adjacent to the recess part 203. The elastic part 243 connects the other ends of the first and second swivel arms 241 and 242. The first and second swivel arms 241 and 242 rotate in mutually opposite directions.

In the folded state, the elastic part 234 extends at a maximum level and, in this state, the other ends of the first and second swivel arms 241 and 242 become away from each other at the maximum level. That is, the first and second swivel arms 241 and 242 may be disposed to be aligned. Here, a cover part 215 moves to cover the other region of the recess part 203. The end portions of the first and second swivel arms 241 and 242 are disposed to be in contact with an edge of the cover part 215. The cover part 215 is provided to open and close the recess part 203 in the folded state and unfolded state.

In the folded state, an elastic force of the elastic part 243 includes a first force generated in a direction perpendicular to an axial direction and a second force generated in a direction in which the elastic part 243 contracts in the axial direction, and the second force is greater than the first force. Thus, an elastic force of the elastic part 243 does not act on movement of the cover part 215.

By a force switching the folded state to the unfolded state, the cover part 215 covering the recess part 203 is gradually moved to be received to the inside of the first body part 210. Accordingly, the other end portions forming an angle between the first and second swivel arms 241 and 242 supporting the cover part 215 move. Accordingly, a direction of elastic force is changed.

In the unfolded state, the first and second swivel arms 241 and 242 support the cover part 215 not to cover the recess part 203 (that is, such that the cover part 215 is maintained in a state of being received in an internal space of the first body part 210).

In a state of supporting the cover part 215, the elastic part 243 forms a third force crossing the axial direction and a fourth force to be reduced in the axial direction. On the basis of positions to which one ends and the other ends of the first and second swivel arms 241 and 242 are fixed and an angle at which the first and second swivel arms 241 and 242 are disposed, the third force is greater than the fourth force.

Accordingly, on the basis of the third force supporting the cover part 215, the first and second body parts 210 and 220 are continuously provided with force in a direction in which the unfolded state is maintained. Thus, in the unfolded state in which the display unit 151 is unfolded, since the first and second body parts 210 and 220 are continuously provided with force maintaining a flat state, the unfolded state may be more firmly maintained.

Figure 6A:
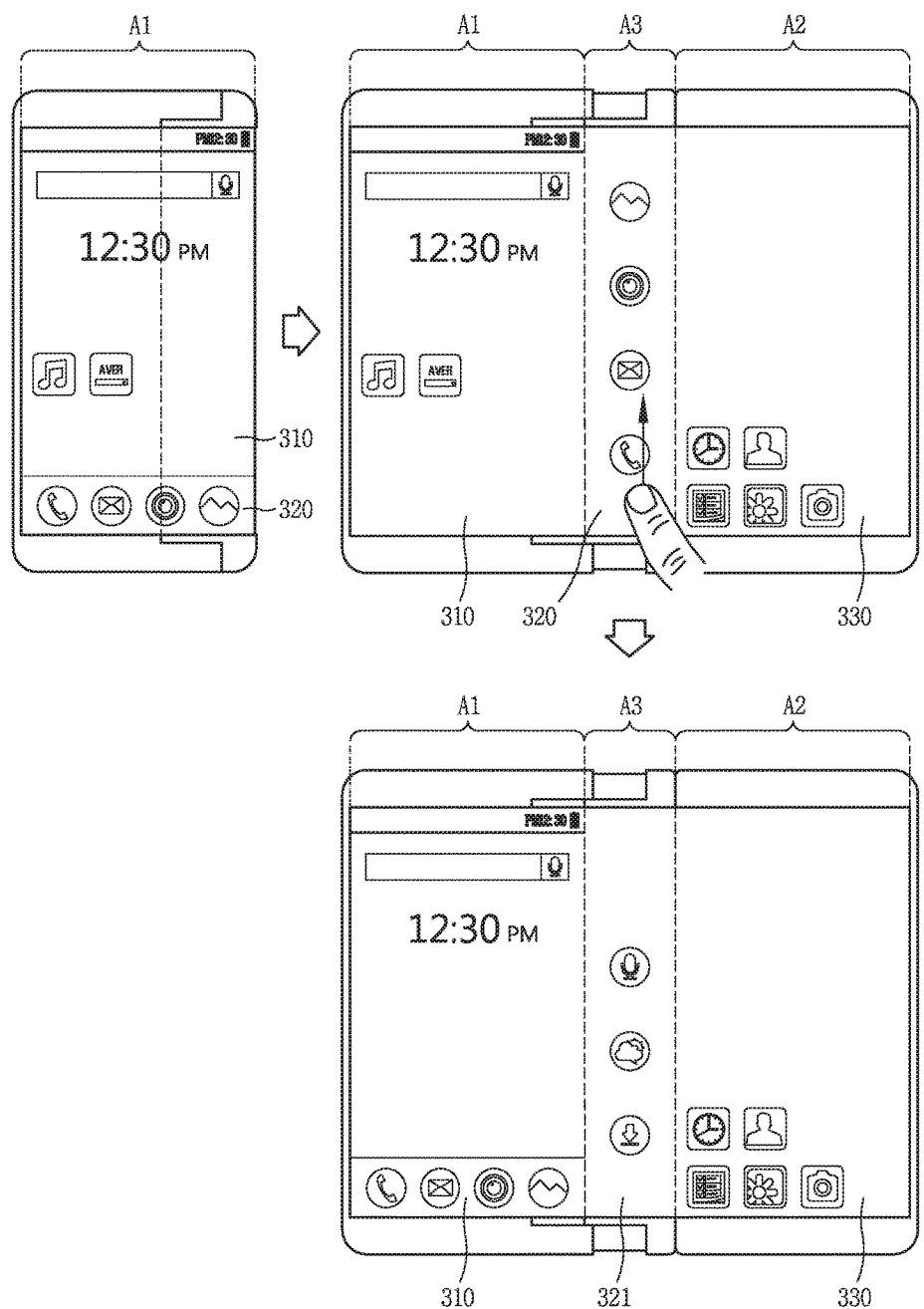
FIGS. 6A to 6C are conceptual views illustrating a structure of a main body having a rollable display unit according to another embodiment.
Figure 6B:
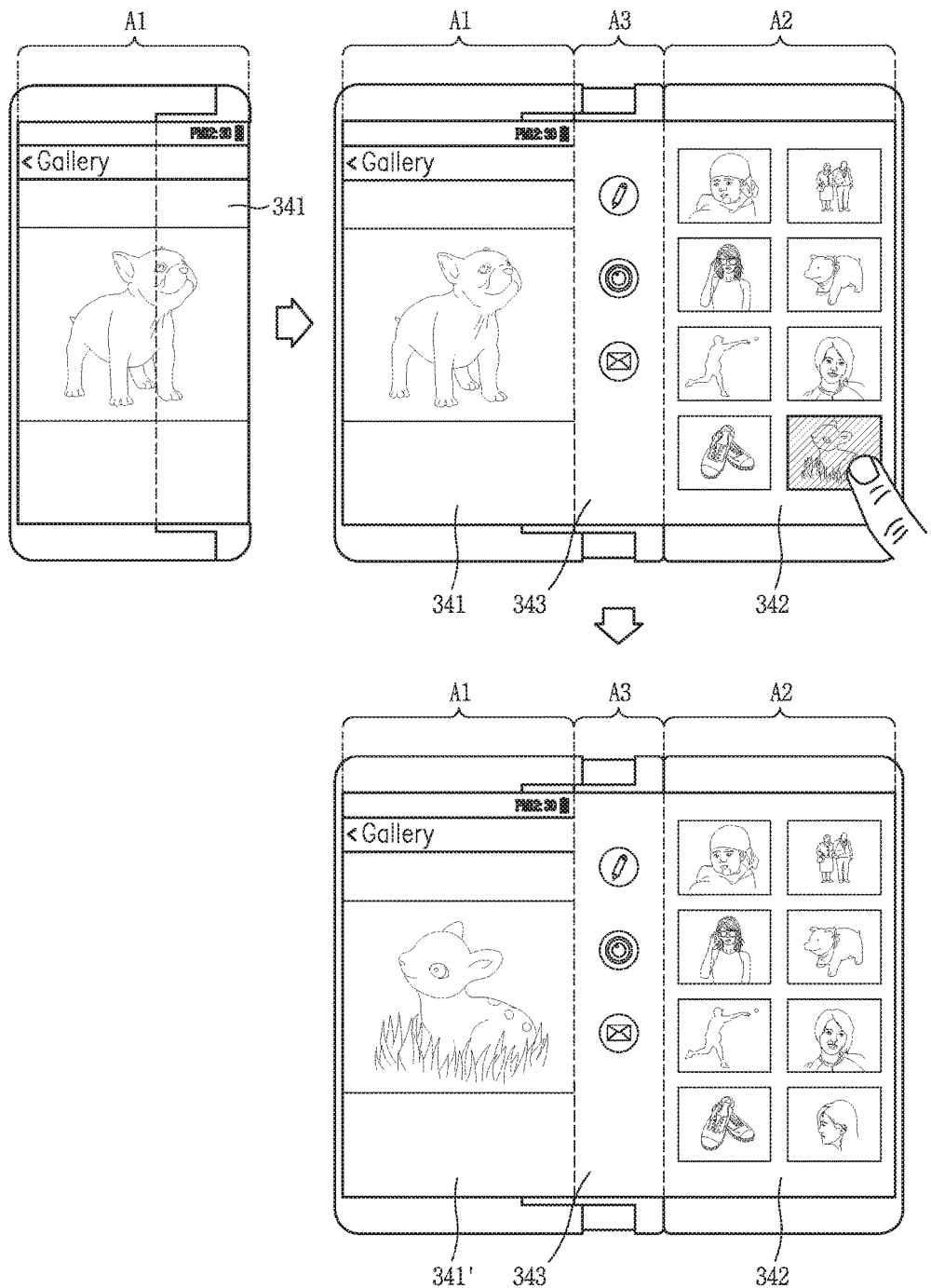
Figure 6C:
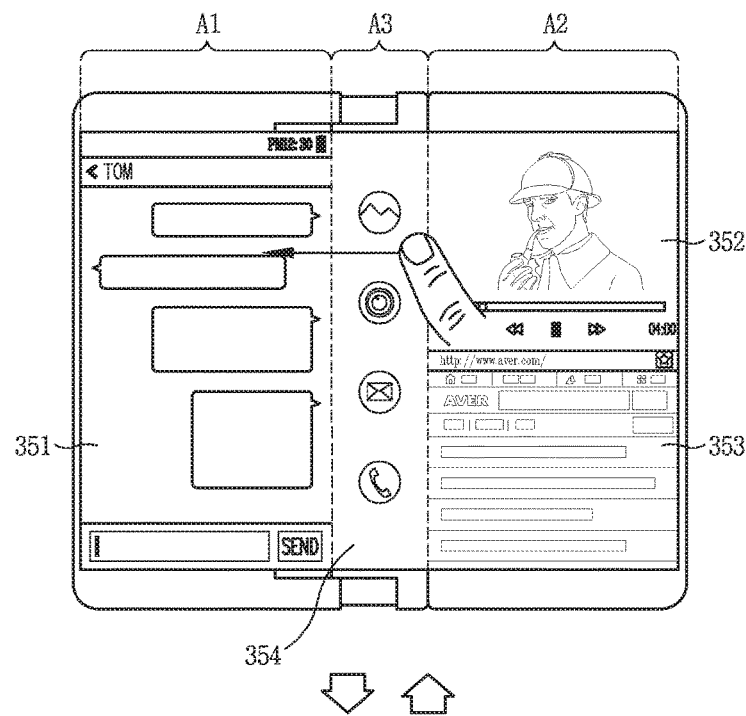
Figure 6C:
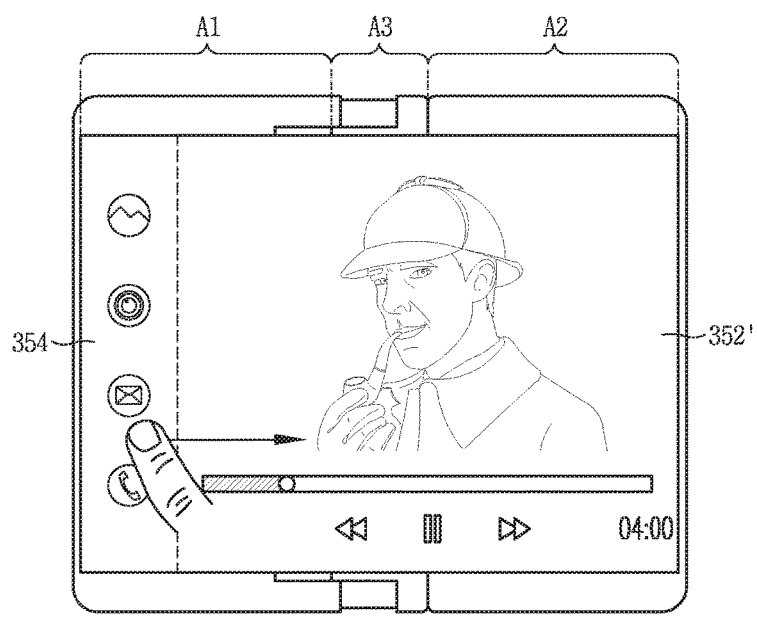

FIGS. 6A to 6C are conceptual views illustrating a structure of a main body having a rollable display unit according to another embodiment.

Referring to FIGS. 1B, 1C, and 6A, in the folded state, first screen information 310 is output on a first region A1 of the display unit 151. The first screen information 310 may be a home screen page including a plurality of icons. On the first region A1, second screen information 320 together with the first screen information 310 is output. The second screen information 320 may include fixed icons continuously output even when the first screen information 310 is switched to screen information including different icons on the basis of a touch input applied to the first screen information 310. The fixed icons may be set by the user.

When the folded state is switched to the unfolded state, the controller 180 may control the display unit 151 to output the first screen information 310 on the first region A1 and third screen information 330 on the second region A2. The first and third screen information 310 and 330 are continuously output home screen pages. Although not shown, the third screen information, instead of the first screen information 310, is output on the basis of a touch input applied to the first region 310 in the folded state.

When the first and third screen information 310 and 330 are output on the first and second regions A1 and A2, respectively, the second information 320 is output on the third region A3. However, an output direction of the second screen information 320 may be changed.

Also, fourth screen information 321 is output on the basis of a touch input applied to the second screen information 320. The fourth screen information 321 includes icons arranged with a layout of the third region A3 maintained, and the icons included in the fourth screen information 321 are different from those of the second screen information 320.

Although not shown, when the electronic device is switched to the unfolded state, an arrangement of the icons included in the first screen information 310 may be changed to be different.

Accordingly, when the electronic device is switched to the unfolded state so the display unit extends, more information may be displayed on the display unit 151 by utilizing the third region.

Referring to FIG. 6B, first screen information 341 is output on the first region A1 of the display unit 151. The first screen information 341 is an execution screen of an executed application. For example, the first screen information 341 may be an image stored as an execution screen of a gallery application.

The controller 180 may output a different image on the basis of a touch input applied to the first screen information 341 or execute a function using the first screen information 341.

When the folded state is switched to the unfolded state, the controller 180 outputs second screen information 342 related to the first screen information 341 on the second region A2. For example, the second screen information 342 may be another execution screen of the executed application. The second screen information 342 may include a plurality of thumbnail images.

The controller 180 may control the display unit 151 to display a different image 341' on the first region A1 on the basis of a touch input applied to the second region A2.

Also, the controller 180 controls the display unit 151 to display third screen image 343 corresponding to a function related to the first screen information 341 output on the first region A1, on the third region A3. The third screen information 343 may include at least one icon corresponding to an application related to the first screen information 341 or may include at least one icon corresponding to a function (editing, deleting, sharing, and the like) related to the first screen information 341.

Referring to FIG. 6C, in the unfolded state, respective execution screens of a plurality of applications may be output on the display unit 151. For example, a first execution screen may be output on the first region A1, and second and third execution screens of first and second applications are output on the second region A2. Here, the second and third execution screen s 342 and 353 are respectively output on divided sections of the second region A1.

An image 354 including an icon of a specific application or an icon corresponding to a specific function may be output on the third region A3 of the display unit 151.

The controller 180 changes an execution screen displayed on the display unit 151 on the basis of a touch input applied to the third region A3. For example, on the basis of a dragging type touch input applied to a boundary region between the second and third regions A2 and A3 (between the second execution screen 342 and the image 354), the second execution screen 352 is displayed on the first and second regions A1 and A2. That is, an extended screen 352' of the second execution screen 352 is displayed on the display unit 151.

Accordingly, the image 354 is displayed to be adjacent to an edge region of the first region A1.

Also, the controller 180 may control the display unit 151 to display a plurality of execution screens on the first and second regions A1 and A2 again on the basis of a dragging touch input applied to the image 354.

Accordingly, in the unfolded state, execution screens of the plurality of applications may be simultaneously displayed on the display unit 151 or one application may be selectively extendedly output. Also, although not shown, when the unfolded state is switched to the folded state, the execution screen may be reduced and output on a specific region.

According to the present embodiments, a plurality of pieces of screen information may be effectively output and a desired icon may be output in a folded state to easily execute a related function.

Figure 7A:
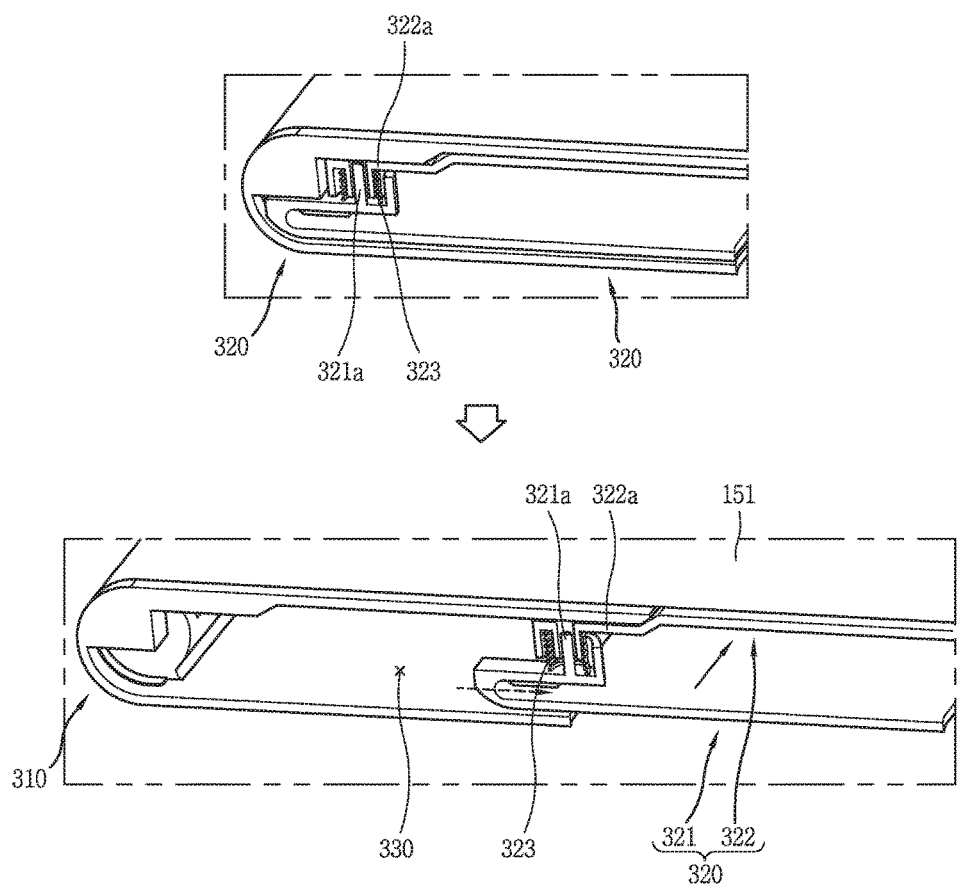
FIGS. 7A and 7B are conceptual views illustrating an electronic device including a rollable display unit according to another embodiment.
Figure 7B:
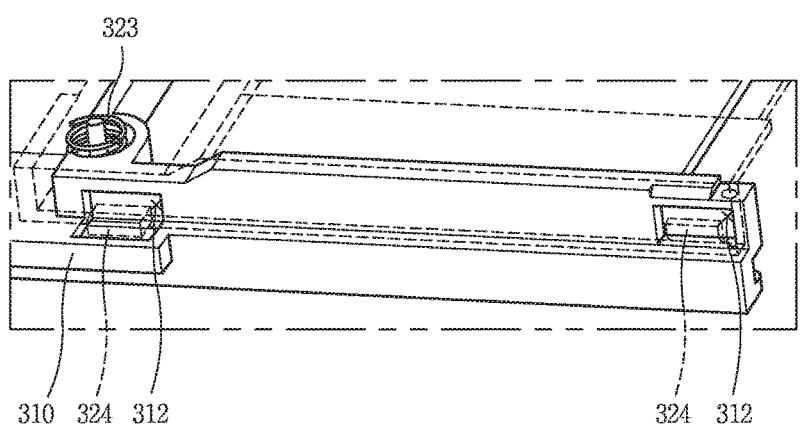

FIGS. 7A and 7B are conceptual views illustrating an electronic device including a rollable display unit according to another embodiment.

Referring to FIGS. 7A and 7B, the electronic device includes first and second body parts 310 and 320. An end portion of the second body part 320 includes a receiving region to which the display unit is rolled to be received.

In a folded state, the second body part 320 is received to the inside of the first body part 310. One region of the display unit 151 is fixed to one surface of the first body part 310, and the first body part 310 includes an internal space 311 to which the second body part 320 is received.

When the second body part 320 is received to the internal space 311 of the first body part 310, the display unit 151 is rolled to be received to the receiving region.

When the folded state is switched to the unfolded state, the second body part 320 is drawn out from the first body part 310 and one region of the display unit 151 is supported by one surface of the second body part 320. In the unfolded state, the first and second body parts 310 and 320 are disposed in parallel, and the display unit 151 forms one plane.

The second body part 320 includes a first member 321 and a second member 322 supporting the display unit 151 in the unfolded state. The first and second members 321 and 322 are coupled to each other and elastically supported by the elastic member 323.

The first member 321 and the second member 322 may include first and second mounting regions 321a and 322a formed to allow a spring as the elastic member 323 to be mounted thereon, respectively.

In the folded state, when the second body part 320 is installed in the internal space 311 of the first body part 310, the elastic member 323 is contracted. That is, a distance between the first and second members 321 and 322 is reduced.

Meanwhile, when the second body part 320 is drawn out from the internal space 311 by a tensile force applied to the first and second bodies 310 and 320, a distance between the first and second members 321 and 322 is increased by an elastic force of the elastic member 323. Accordingly, the display unit 151 is elastically supported by the second member 322. Accordingly, one region of the display unit 151 supported by the second body part 320 is supported to be flat.

Meanwhile, end portions of the first and second body parts 310 and 320 include first and second guide sloped surfaces 313 and 322b formed to slidably move when the second body part 320 is drawn out. Due to the tensile force, the first and second guide sloped surfaces 313 and 322b move aslant in mutually facing directions, and while the first and second guide sloped surfaces 313 and 322b move in a sloping manner, the elastic member 323 extends.

Referring to FIG. 7B, the first body part 310 includes at least one arrest recess 312, and the second body part 320 includes at least one arrest hook 324 formed to be arrested by the arrest recess 312.

In the unfolded state, the arrest hook 324 is arrested by the arrest recess 312, so the second body part 320 cannot drawn out any further from the first body part 310. Accordingly, due to the presence of the arrest recess 312 and the arrest hook 324, separation of the first and second body parts 310 and 320 may be prevented.

According to the present embodiment, the second body part may be inserted and drawn out by the elastic member formed in the second body part, and in a state in which the second body is drawn out, the display unit may be supported to be flat.

The present invention described above may be implemented as a computer-readable code in a medium in which a program is recorded. The computer-readable medium includes any type of recording device in which data that can be read by a computer system is stored. The computer-readable medium may be, for example, a hard disk drive (HDD), a solid state disk (SSD), a silicon disk drive (SDD), a ROM, a RAM, a CD-ROM, a magnetic tape, a floppy disk, an optical data storage device, and the like. The computer-readable medium also includes implementations in the form of carrier waves (e.g., transmission via the Internet). Also, the computer may include the controller 180 of the terminal. Thus, the foregoing detailed description should not be interpreted limitedly in every aspect and should be considered to be illustrative. The scope of the present invention should be determined by reasonable interpretations of the attached claims and every modification within the equivalent range are included in the scope of the present invention.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. An electronic device, comprising:
   a first body and a second body, wherein the first body comprises a first support region and a second support region, wherein the first support region includes ribs which cooperate with ribs of the second support region, wherein the first body and the second body are positionable between an unfolded state and a folded state, and wherein the first support region is positionable relative to the second support region in opposing first and second directions when in the unfolded state;
   a connecting member connecting the first body with the second body, wherein the connecting member permits positioning of the first body and the second body between the unfolded state and the folded state;
   a display located on a side of each of the first body and the second body, wherein the display comprises a first region, a second region, and a third region located between the first region and the second region; and
   an elastic member providing an elastic force to maintain displacement of the first support region relative to the second support region in the unfolded state.

2. The electronic device of claim 1, wherein
   a first swivel arm and a second swivel arm located in a recess of the first body, wherein a first end of each of the first swivel arm and the second swivel arm are coupled to the first support region of the first body,
   wherein the elastic member is coupled to a second end of each of the first swivel arm and the second swivel arm, and
   wherein the first swivel arm and the second swivel arm rotatably move in mutually opposite directions when the first support region is positioned relative to the second support region in opposing first and second directions when in the unfolded state.

3. The electronic device of claim 2, wherein
   the connecting member includes a hinge shaft extending in a direction, and
   in the unfolded state, the elastic member provides a contracting elastic force in a direction parallel to the direction of the hinge shaft, and
   in the folded state the elastic member provides a force in a direction perpendicular to the hinge shaft direction.

4. The electronic device of claim 3, wherein
   the first body includes a cover moving to open and close the recess by an elastic force when switching to the folded state or the unfolded state, and moving the first swivel arm and the second swivel arm.

5. The electronic device of claim 2, wherein
   the recess is formed in a region overlapping the display.

6. The electronic device of claim 1, wherein
   the connecting member is a hinge shaft,
   the first support region is coupled to the hinge shaft,
   the ribs of the first support region extend in a direction away from the hinge shaft, and spaces are formed between the ribs of the first support region.

7. The electronic device of claim 1, wherein
   the first support region is sized to receive the second support region when in the folded state.

8. The electronic device of claim 7, wherein
   the first support region includes the elastic member within a defined space.

9. The electronic device of claim 1, wherein
   the first support region, the second support region, and the second body include a bezel region, and
   the ribs the first support region, the ribs of the second support region, and the elastic member, overlap with the display.

10. The electronic device of claim 1, further comprising:
    a controller configured to:
    cause the display to display first screen information on the first region of the display that corresponds the first body, when in the folded state;
    cause the display to display second screen information different from the first screen information on the second region of the display that corresponds to the second body, after switching from the folded state to the unfolded state; and
    cause the display to display a portion of the first screen information on the third region of the display, after switching from the folded state to the unfolded state.

11. The electronic device of claim 10, wherein
    the first screen information and the second screen information include a plurality of icons respectively corresponding to a plurality of applications.

12. The electronic device of claim 1, further comprising:
    a controller configured to:
    cause the display to display a first execution screen of a specific application on the first region of the display that corresponds the first body, when in the folded state;

cause the display to display a second execution screen of the application on the second region of the display that corresponds to the second body, after switching from the folded state to the unfolded state; and cause the display to display an image that relates to the first execution screen on the third region of the display, after switching from the folded state to the unfolded state.

13. The electronic device of claim 12, further comprising:
a controller configured to:
change the first execution screen displayed on the first region of the display in response to a touch received at the second region.

14. The electronic device of claim 1, further comprising:
a controller configured to:
cause the display to display a plurality of execution screens of different applications on the first region and the second region, and display an image including a specific icon on the third region, when in the folded state.

15. The electronic device of claim 14,
wherein the controller is further configured to:
cause the display to magnify or reduce one of the plurality of execution screens based on a drag touch input applied to the first region, the second region, and the third region of the display.

16. The electronic device of claim 1, wherein the elastic member is coupled to the first support region and the second support region.

17. The electronic device of claim 1, wherein
in the folded state, the first region of the display faces a first direction, the second region of the display faces a second direction that is opposite that of the first direction, and
in the unfolded state, the first region of the display, the second region of the display, and the third region of the display, all face the first direction.

* * * * *